(12) United States Patent  
Dokai et al.

(10) Patent No.: US 9,177,240 B2  
(45) Date of Patent: Nov. 3, 2015

(54) COMMUNICATION DEVICE

(71) Applicant: Murata Manufacturing Co., Ltd., Nagaokakyo-shi, Kyoto-fu (JP)

(72) Inventors: Yuya Dokai, Nagaokakyo (JP); Masato Nomura, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/574,781

(22) Filed: Dec. 18, 2014

(65) Prior Publication Data

US 2015/0136859 A1 May 21, 2015

Related U.S. Application Data

(63) Continuation of application No. PCT/JP2013/065801, filed on Jun. 7, 2013.

(30) Foreign Application Priority Data

Jul. 11, 2012 (JP) .................................. 2012-156024  
Oct. 16, 2012 (JP) .................................. 2012-228571

(51) Int. Cl.  
  *G06K 19/06* (2006.01)  
  *G06K 7/08* (2006.01)  
  *G06K 19/07* (2006.01)  
  (Continued)

(52) U.S. Cl.  
  CPC .......... *G06K 19/0709* (2013.01); *G06K 19/073* (2013.01); *G06K 19/07754* (2013.01); *G06K 19/07784* (2013.01); *G06K 19/07786* (2013.01); *H01Q 1/2216* (2013.01); *H01Q 7/00* (2013.01); *H04B 1/0458* (2013.01); *H04B 1/18* (2013.01)

(58) Field of Classification Search  
  USPC ........................ 235/451, 492; 455/180, 180.1  
  See application file for complete search history.

(56) References Cited

U.S. PATENT DOCUMENTS 7,762,470 B2 * 7/2010 Finn et al. ...................... 235/492  
2007/0218951 A1 * 9/2007 Risheq et al. ............... 455/562.1  
(Continued)

FOREIGN PATENT DOCUMENTS

WO 2009/011154 A1 1/2009  
WO 2009/128437 A1 10/2009  
(Continued)

OTHER PUBLICATIONS

Official Communication issued in International Patent Application No. PCT/JP2013/065801, mailed on Aug. 27, 2013.

*Primary Examiner* — Tuyen K Vo  
(74) *Attorney, Agent, or Firm* — Keating & Bennett, LLP (57) ABSTRACT

A communication device includes a radiator defining a duplex antenna of a first communication system whose carrier frequency is in a first frequency band and a second communication system whose carrier frequency is in a second frequency band overlapping the first frequency band, an antenna for the second communication system, a second communication system power feeding unit which is connected to the radiator and the antenna for the second communication system, and a first communication system power feeding unit which is connected to the radiator, wherein the first communication system power feeding unit includes a circuit configured to position a communication peak frequency whose communicable distance in the first communication system is maximum, outside the second frequency band.

16 Claims, 8 Drawing Sheets

(51) Int. Cl.

| | | |
|---|---|---|
| *H01Q 1/22* | (2006.01) | |
| *H01Q 7/00* | (2006.01) | |
| *G06K 19/073* | (2006.01) | |
| *G06K 19/077* | (2006.01) | |
| *H04B 1/04* | (2006.01) | |
| *H04B 1/18* | (2006.01) | |

(56) References Cited

U.S. PATENT DOCUMENTS

2008/0308641 A1* 12/2008 Finn .............................. 235/492

2009/0021446 A1 1/2009 Kataya et al.
2010/0308118 A1 12/2010 Kataya et al.
2011/0084888 A1 4/2011 Nishioka et al.
2011/0127336 A1 6/2011 Kato
2013/0249744 A1* 9/2013 Jang et al. ..................... 343/702
2013/0285875 A1* 10/2013 Kawahata ..................... 343/852
2013/0335281 A1* 12/2013 Dokai ........................... 343/748

FOREIGN PATENT DOCUMENTS

WO 2010/001837 A1 1/2010
WO 2010/021217 A1 2/2010

* cited by examiner

COMMUNICATION DEVICE

BACKGROUND OF THE INVENTION

1. Field of the Invention

The present invention relates to a communication device which is preferably used in two or more communication systems which use carrier signals of the same frequency band. More particularly, the present invention relates to a communication device which includes an RFID (Radio Frequency Identification) system antenna and a mobile communication system antenna.

2. Description of the Related Art

An RFID system which transmits and receives predetermined information between an RFID reader/writer and an RFID tag is known. The RFID reader/writer and the RFID tag have RFID IC chips (wireless IC chips) which process high frequency signals, and antennas which transmit and receive the high frequency signals.

The RFID system is generally an HF band RFID system which uses a 13 MHz band or a UHF band RFID system which uses a 900 MHz band. The UHF band RFID system in particular has a long communication distance and can collectively read a plurality of tags, and therefore is regarded as a viable goods management system.

For a goods management RFID system for process management and history management of electronic devices such as portable communication terminals, UHF band RFID systems which are disclosed in International Publication Nos. 2009/011154 and 2009/128437 and use a ground conductor of a printed circuit board as a radiating element are useful.

Figure 7A:
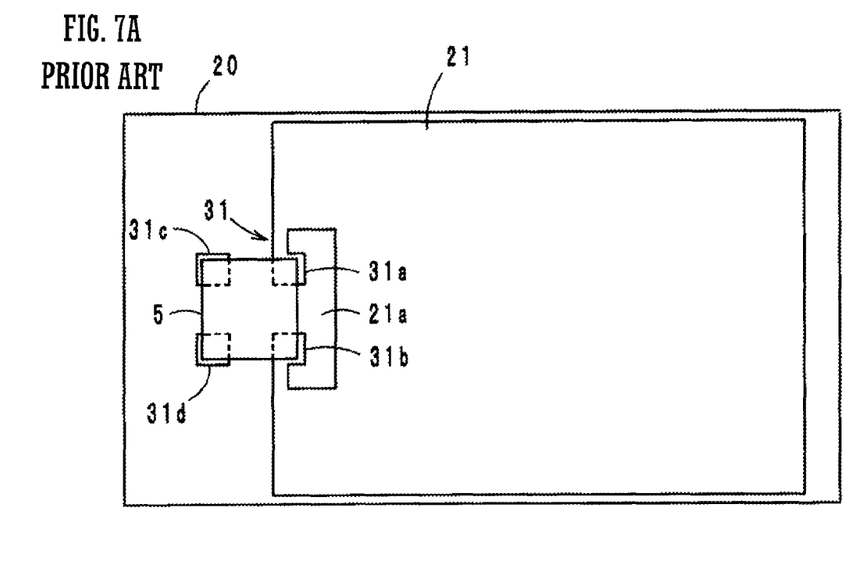
FIG. 7A is a plan view of a wireless IC device disclosed in International Publication No. 2009/011154.
Figure 7B:
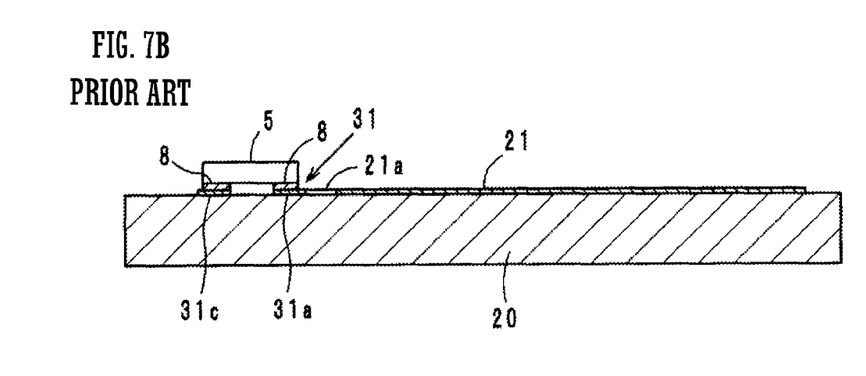
FIG. 7B is a cross-sectional view of the wireless IC device.

FIG. 7A is a plan view of a wireless IC device disclosed in International Publication No. 2009/011154, and FIG. 7B is a cross-sectional view of the wireless IC device. A ground conductor 21 is provided on a surface of a printed circuit board 20 of this wireless IC device. A cutout 21a is formed in one side portion of the ground conductor 21 to provide a loop electrode 31. Input/output terminal electrodes of a wireless IC chip 5 are electrically connected to connection electrodes 31a and 31b through bumps 8. Further, connection electrodes 31c and 31d are formed on the surface of the printed circuit board 20. Mounted terminal electrodes of the wireless IC chip 5 are electrically connected to the connection electrodes 31c and 31d through the bumps 8. The loop electrode 31 electromagnetically couples to the ground conductor 21 and functions as a matching circuit, and the ground conductor 21 functions as a UHF band RFID radiating element.

However, when a UHF band RFID system which uses a ground conductor of a printed circuit board as a radiating element is applied to a communication terminal device which uses a UHF band for mobile communication such as a GSM (registered trademark) (Global System for Mobile Communications) 900, total radiated power (TRP) upon transmission or total isotropic sensitivity (TIS) upon reception in the GSM (registered trademark) system deteriorates.

According to this phenomenon, a resonance point of an RFID tag appears at 900 MHz in a frequency band of a mobile communication antenna (a frequency band used by a mobile communication system). Therefore, it is predicted that the resonance point makes it difficult for the mobile communication antenna to receive communication signals of the mobile communication system.

Figure 8A:
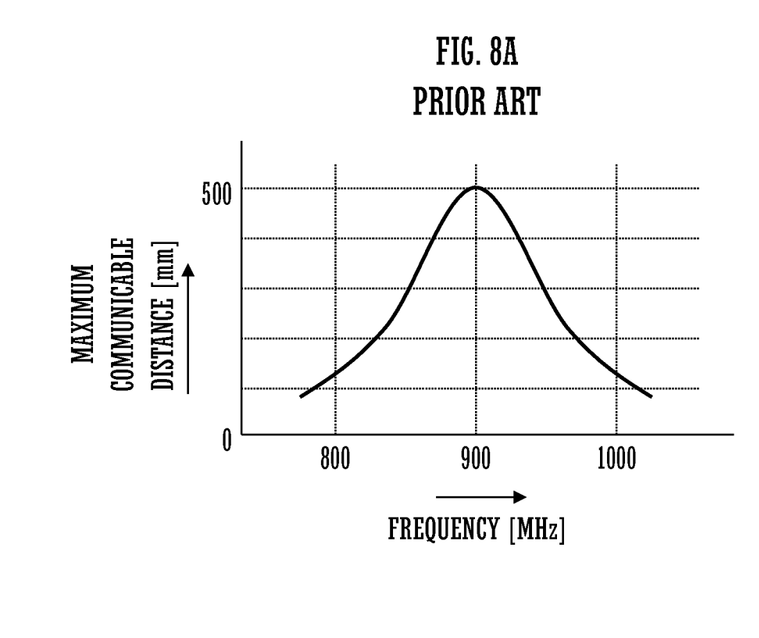
FIG. 8A is a view illustrating a relationship between a communication frequency and a maximum communicable distance of a conventional RFID tag.
Figure 8B:
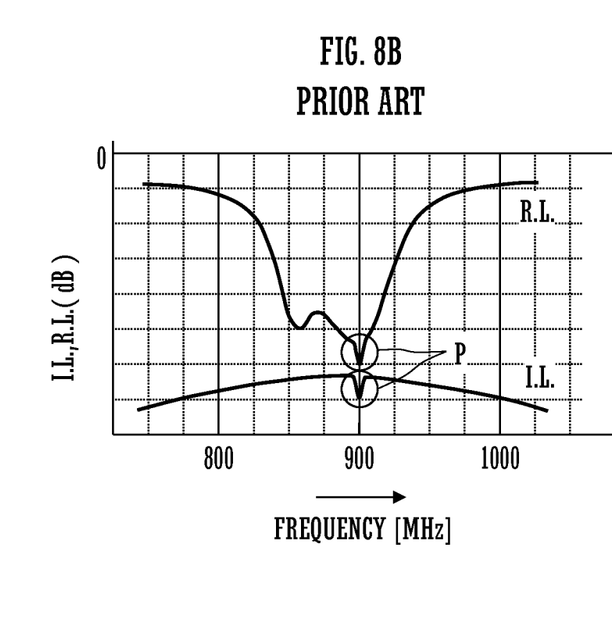
FIG. 8B is a view illustrating frequency characteristics of insertion loss I.L. and return loss R.L. of a mobile communication antenna.

FIG. 8A is a view illustrating a relationship between a communication frequency and a maximum communicable distance of a conventional RFID tag. FIG. 8B is a view illustrating frequency characteristics of insertion loss I.L. and return loss R.L. of a mobile communication antenna. A resonance frequency of an antenna of an RFID tag matches 900 MHz used by the RFID system. Therefore, as illustrated in FIG. 8A, a maximum communicable distance comes to a peak at 900 MHz and decreases even if the frequency becomes higher or lower. Because the resonance frequency of the antenna of this RFID tag is 900 MHz, as illustrated in FIG. 8B, a resonance point P appears at 900 MHz in the frequency band of the mobile communication antenna (the frequency band used by the mobile communication system). As a result, total radiated power (TRP) upon transmission and total isotropic sensitivity (TIS) upon reception in the mobile communication system deteriorate.

SUMMARY OF THE INVENTION

Preferred embodiments of the present invention provide a communication device which is preferably used in two or more communication systems which use carrier signals of the same frequency band, and prevents a signal of one communication system from undermining communication characteristics of the other communication system.

A communication terminal device according to a preferred embodiment of the present invention includes a radiator defining a duplex antenna of a first communication system whose carrier frequency is in a first frequency band and a second communication system whose carrier frequency is in a second frequency band overlapping the first frequency band; an antenna for the second communication system; a second communication system power feeding unit which is connected to the radiator and the antenna for the second communication system; and a first communication system power feeding unit which is connected to the radiator, wherein the first communication system power feeding unit includes a circuit configured to position a communication peak frequency whose communicable distance in the first communication system is maximum, outside the second frequency band.

For example, the first communication system preferably is an RFID system of a UHF band, and the second communication system preferably is a mobile communication system of the UHF band.

Preferably, the antenna for the second communication system is a mobile communication system antenna, the second communication system power feeding unit is a mobile communication power feeding unit, and the first communication system power feeding unit is an RFID power feeding unit which includes an RFID IC and an RFID power feeding circuit connected to the RFID IC.

The RFID power feeding circuit preferably includes a broader band conversion circuit which is connected between the RFID IC and the radiator and is configured to convert resonance frequency characteristics (radiation characteristics) of the RFID system radiator into a broadband.

Preferably, the broader band conversion circuit is configured to generate two resonance points on a lower band side and on a higher band side than the second frequency band.

Preferably, the broader band conversion circuit included a body including a stack of a plurality of base layers.

Preferably, the radiator is a conductive housing or a ground conductor.

According to various preferred embodiments of the present invention, a resonance point of an RFID antenna does not appear in a passband of a mobile communication antenna, so that it is possible to prevent deterioration of total radiated power (TRP) upon transmission and total isotropic sensitivity (TIS) upon reception in the passband of the mobile communication antenna.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
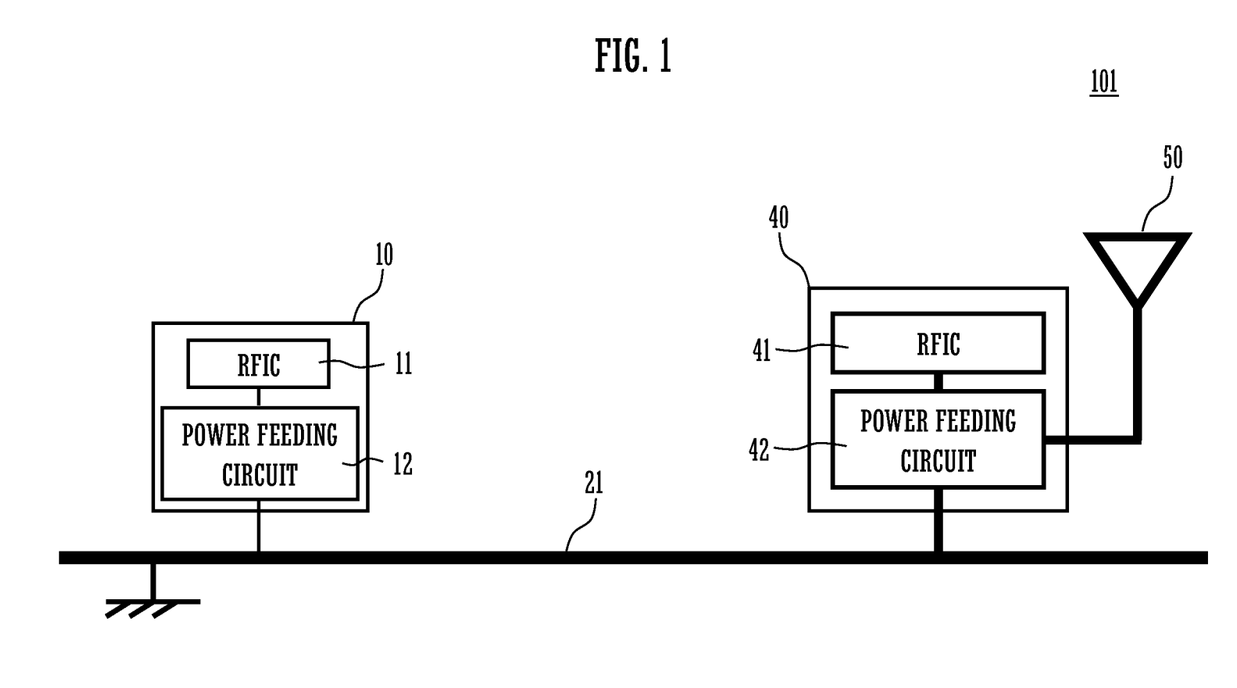
FIG. 1 is a circuit diagram of an antenna system of a communication terminal device 101 according to a preferred embodiment of the present invention.

FIG. 1 is a circuit block diagram of an antenna system of a communication terminal device 101 according to a preferred embodiment of the present invention. This communication terminal device 101 is preferably used in an RFID system which is a first communication system and uses the UHF band as a carrier frequency, and a mobile communication system which is a second communication system and uses the UHF band as a carrier frequency likewise. The communication terminal device 101 includes a ground conductor 21, an RFID power feeding unit 10, a mobile communication power feeding unit 40 and a mobile communication antenna 50. The ground conductor 21 is provided in or on a printed circuit board 20. The RFID power feeding unit 10 includes an RFID IC chip (RFIC) 11 and a power feeding circuit 12. The mobile communication power feeding unit 40 includes a mobile communication IC chip (RFIC) 41 and a power feeding circuit 42.

The power feeding circuit 12 is connected to the ground conductor 21 and the RFID IC chip 11. The RFID IC chip 11 preferably is a semiconductor integrated circuit configured to process communication signals for the RFID system, and includes, for example, a rectifier circuit, a boosting circuit and a modulating/demodulating circuit. The power feeding circuit 12 includes, for example, a matching circuit configured to match an impedance between the RFID IC chip 11 and the ground conductor 21, a broader band conversion circuit configured to convert a transmissible/receivable frequency band into a broadband, and a filter circuit configured to cancel a harmonic.

The power feeding circuit 42 is provided between the mobile communication antenna 50 and the mobile communication IC chip 41, and is grounded to the ground conductor 21. The mobile communication IC chip 41 preferably is a semiconductor communication circuit configured to process communication signals for the mobile communication system, and includes, for example, an amplifier circuit and a modulating/demodulating circuit. The mobile communication power feeding circuit 42 includes, for example, a matching circuit configured to match an impedance between the mobile communication IC chip 41 and the ground conductor 21, a broader band conversion circuit configured to convert a transmissible/receivable frequency band into a broadband, and a filter circuit configured to cancel a harmonic.

The RFID power feeding unit 10 and the ground conductor 21 define an RFID tag. Further, the mobile communication antenna 50 and the ground conductor 21 define a dipole antenna used for mobile communication. That is, the ground conductor 21 defines a radiator configured to function as a duplex antenna in the RFID system and the mobile communication system.

Figure 2A:
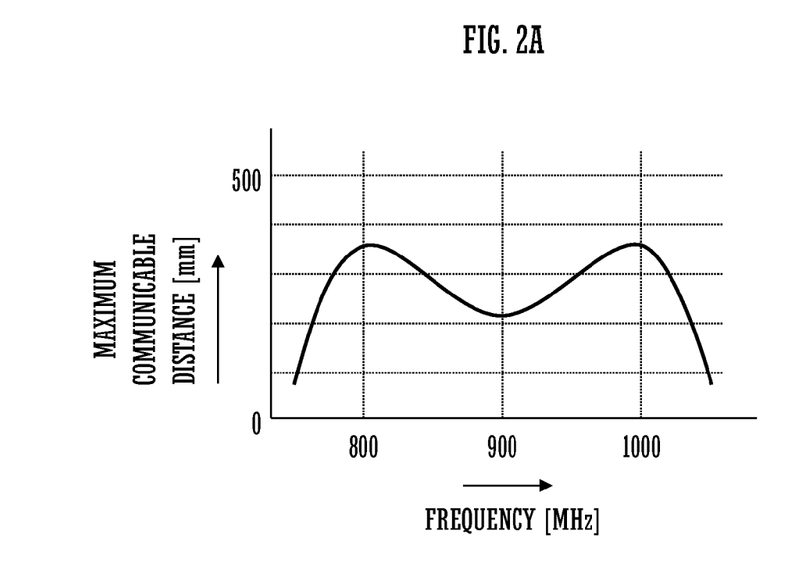
FIG. 2A is a view illustrating a relationship between a communication frequency and a maximum communicable distance of an RFID tag of the communication terminal device 101.
Figure 2B:
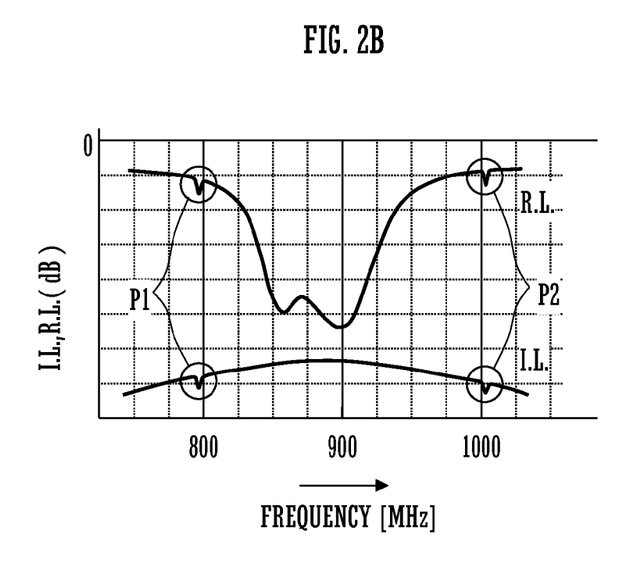
FIG. 2B is a view illustrating frequency characteristics of insertion loss I.L. and return loss R.L. of a mobile communication antenna (an antenna formed by a mobile communication antenna 50 and a ground conductor 21).

FIG. 2A is a view illustrating a relationship between a communication frequency and a maximum communicable distance of the RFID tag of the communication terminal device 101. FIG. 2B is a view illustrating frequency characteristics of insertion loss I.L. and return loss R.L. of a mobile communication antenna (an antenna including a mobile communication antenna 50 and a ground conductor 21).

The power feeding circuit 12 in the RFID power feeding unit 10 illustrated in FIG. 1 includes a broader band conversion circuit which converts a passband of an RFID system communication signal into a broadband. In this example, the relationship between the frequency and a maximum communicable distance of an RFID tag shows bimodality as illustrated in FIG. 2A, and provides broadband characteristics. In this example, peaks at which communicable distances become maximum appear at 800 MHz and 1 GHz, i.e., communication peak frequencies appear at 800 MHz and 1 GHz, and gain is obtained in a broad frequency band from 750 MHz to 1.05 GHz.

That resonance points of the RFID system radiator appear at 800 MHz and 1 GHz causes, as illustrated in FIG. 2B, resonance points P1 and P2 appear at 800 MHz and 1 GHz. In this regard, according to a GSM (registered trademark) 850 standard, a frequency band of 824 MHz to 849 MHz is allocated to a transmission carrier frequency and a frequency band of 869 MHz to 894 MHz is allocated to a reception carrier frequency, respectively. According to the GSM (registered trademark) 900 standard, a frequency band of 880 MHz to 915 MHz is allocated to a transmission carrier frequency and a frequency band of 925 MHz to 960 MHz is allocated to a reception carrier frequency, respectively. The frequencies at the two resonance points P1 and P2 are frequencies which are not used by the mobile communication system, and therefore total radiated power (TRP) upon transmission and total isotropic sensitivity (TIS) upon reception of mobile communication signals do not deteriorate. That is, while gain of the RFID system is sacrificed more or less, the RFID system does not significantly undermine communication characteristics of the mobile communication system.

Figure 3:
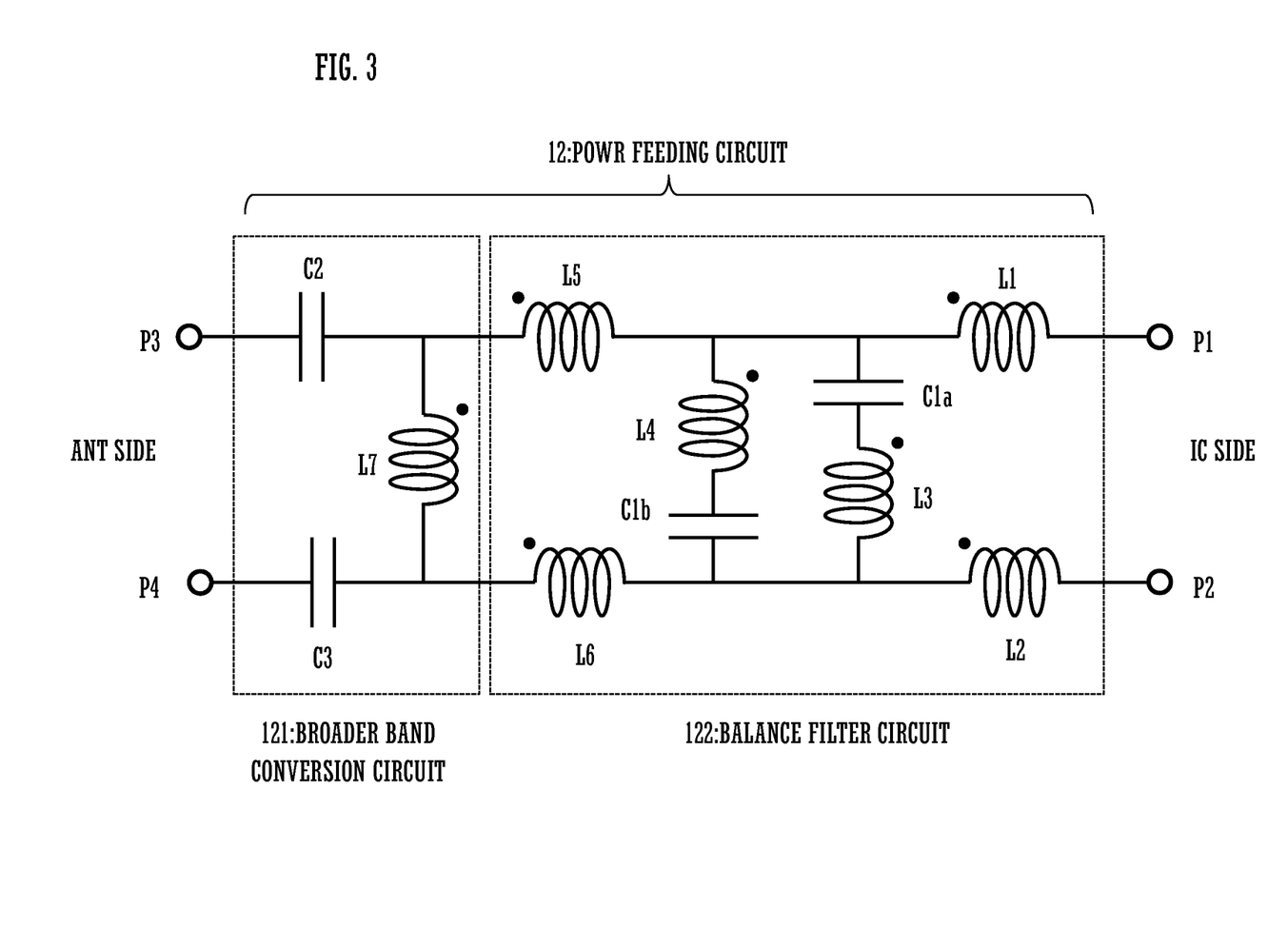
FIG. 3 is a specific circuit diagram of a power feeding circuit 12.

FIG. 3 is a specific equivalent circuit diagram of the power feeding circuit 12. Terminals P3 and P4 of this power feeding circuit 12 are connected to a loop electrode of the ground conductor 21. The terminals P1 and P2 are connected to the RFID IC chip 11. That is, the RFID IC chip 11 includes a balance type input/output terminal, and the power feeding circuit 12 is a balance type power feeding circuit. The power feeding circuit 12 includes a broader band conversion circuit 121 and a balance filter circuit 122. The broader band conversion circuit 121 and the balance filter circuit 122 also are configured to function as matching circuits which match an impedance between the RFID IC chip 11 and the ground conductor 21.

The broader band conversion circuit 121 is configured such that resonance points of the resonance circuit including a floating capacitance component of the RFID IC chip 11, an inductance component of the loop electrode of the ground conductor 21 connected to the terminals P3 and P4 and a capacitance component and an inductance component of the balance filter circuit 122 appear at 800 MHz and 1 GHz.

When a transmission signal outputted from the mobile communication IC chip 41 is inputted to the RFID IC chip 11 in the RFID power feeding unit 10 through the ground conductor, distortion is produced. The balance filter circuit 122 is a filter circuit configured to prevent a harmonic produced by this distortion from being transmitted to the ground conductor 21 side.

Figure 4A:
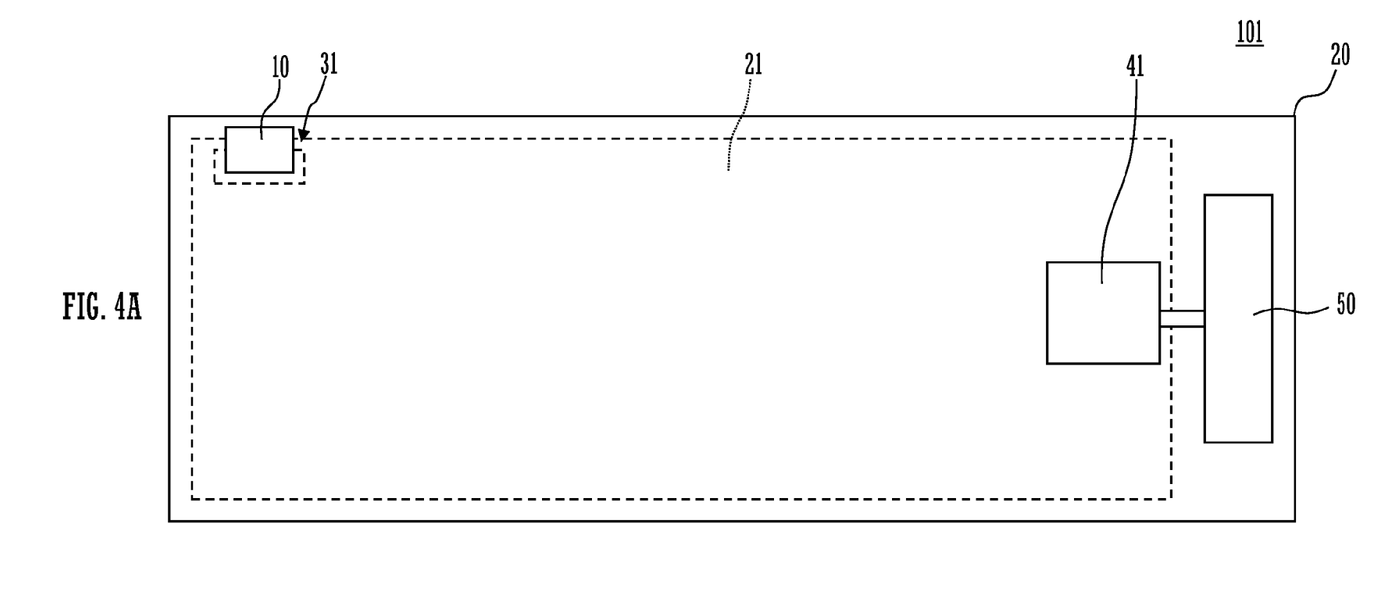
FIG. 4A is a plan view of a main portion inside a housing of the communication terminal device 101.
Figure 4B:
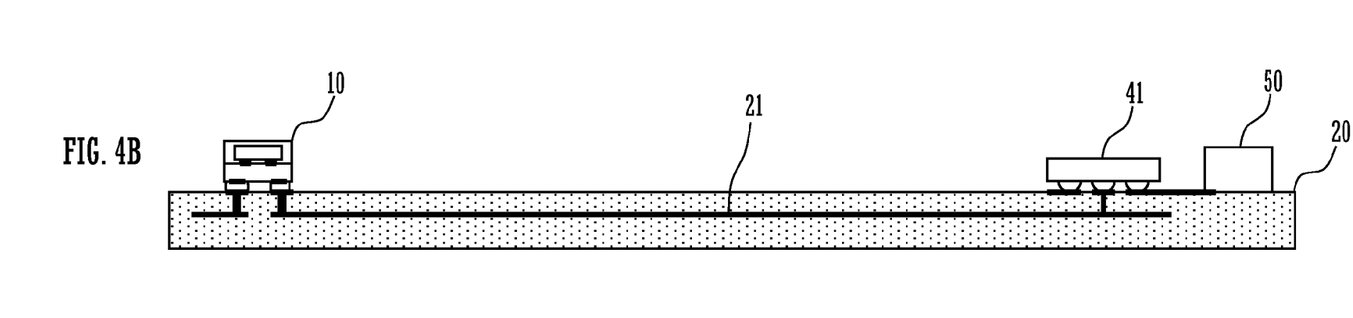
FIG. 4B is a schematic view illustrating the main portion inside the housing of the communication terminal device 101 from a side surface direction.

FIG. 4A is a plan view of a main portion inside a housing of the communication terminal device 101, and FIG. 4B is a schematic view illustrating the main portion inside the housing of the communication terminal device 101 from a side surface direction. The ground conductor 21 is preferably provided inside the printed circuit board 20, a cutout is provided in a portion of the ground conductor 21 and an inner periphery of this cutout portion is used for a loop electrode 31. The RFID power feeding unit 10, the mobile communication (GSM (registered trademark) 900) antenna 50 and the mobile communication IC chip 41 are mounted on the printed circuit board 20.

In addition, in the example in FIGS. 4A and 4B, the ground conductor 21 is preferably provided inside the printed circuit board 20. However, the ground conductor may be provided on the surface of the printed circuit board 20. In this case, regions on which the RFID power feeding unit 10 and the mobile communication IC chip 41 are mounted are defined by a resist layer provided on the surface of the ground conductor 21. Further, while a planar shape of the printed circuit board 20 is not limited to a rectangular or substantially rectangular shape, a planar shape of the ground conductor 21 is likewise not limited to a rectangular or substantially rectangular shape.

Terminals of a module portion (the terminals P3 and P4 of the power feeding circuit 12 illustrated in FIG. 3) which define the RFID power feeding unit 10 are connected to two terminals of the loop electrode 31. The mobile communication antenna 50 is provided on a non-ground conductor formation region on the printed circuit board 20. In addition, the mobile communication power feeding circuit 42 (see FIG. 1) is mounted on the ground conductor formation region of the printed circuit board 20 together with the mobile communication IC chip 41, but this is not illustrated.

Figure 5:
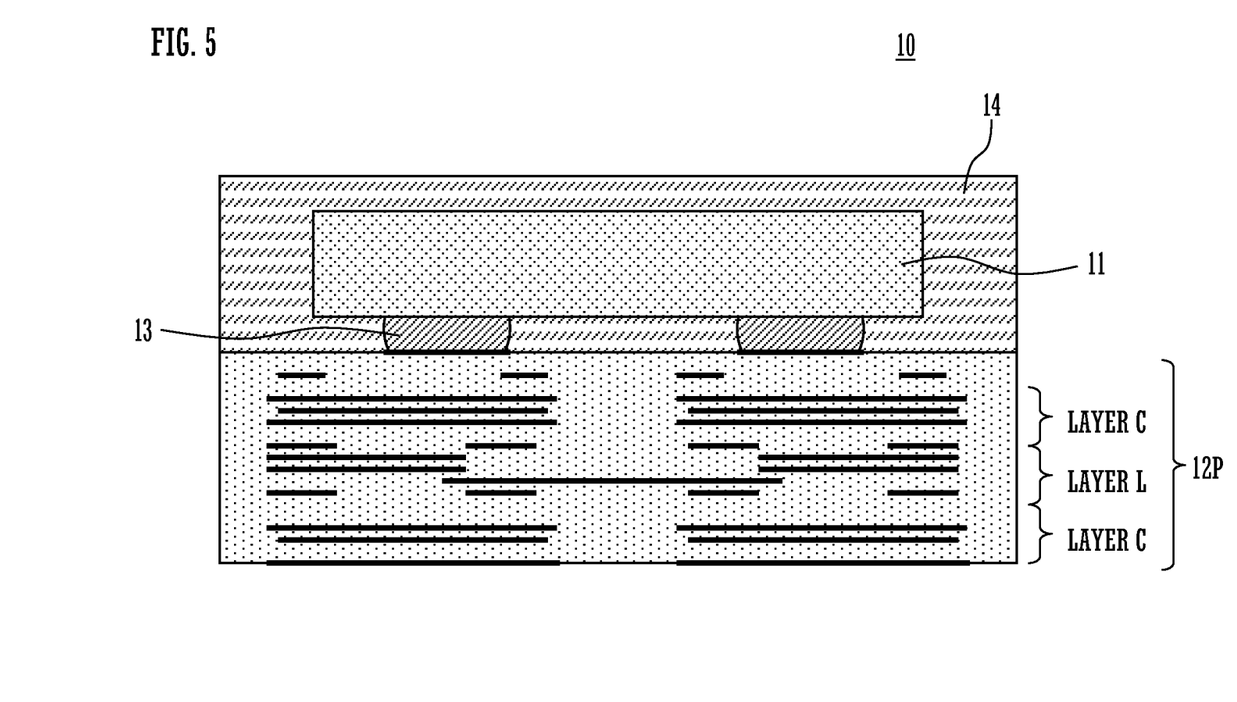
FIG. 5 is a cross-sectional view of an RFID power feeding unit 10.

FIG. 5 is a cross-sectional view of a module portion which defines the RFID power feeding unit 10. The module portion which defines the RFID power feeding unit 10 preferably has a structure which includes a power feeding circuit substrate 12P in which the power feeding circuit 12 is provided, and in which the RFID IC chip 11 is mounted on the power feeding circuit substrate 12P across conductive bonding members (solder bumps) 13. A circumference of the RFID IC chip 11 is sealed by sealing resin 14. An upper layer and a lower layer of the power feeding circuit substrate 12P preferably are capacitor formation layers (layers C), and an intermediate layer is preferably an inductor formation layer (layer L). Consequently, it is possible to stabilize an inductance value of an inductor pattern in the inductor formation layer.

Figure 6:
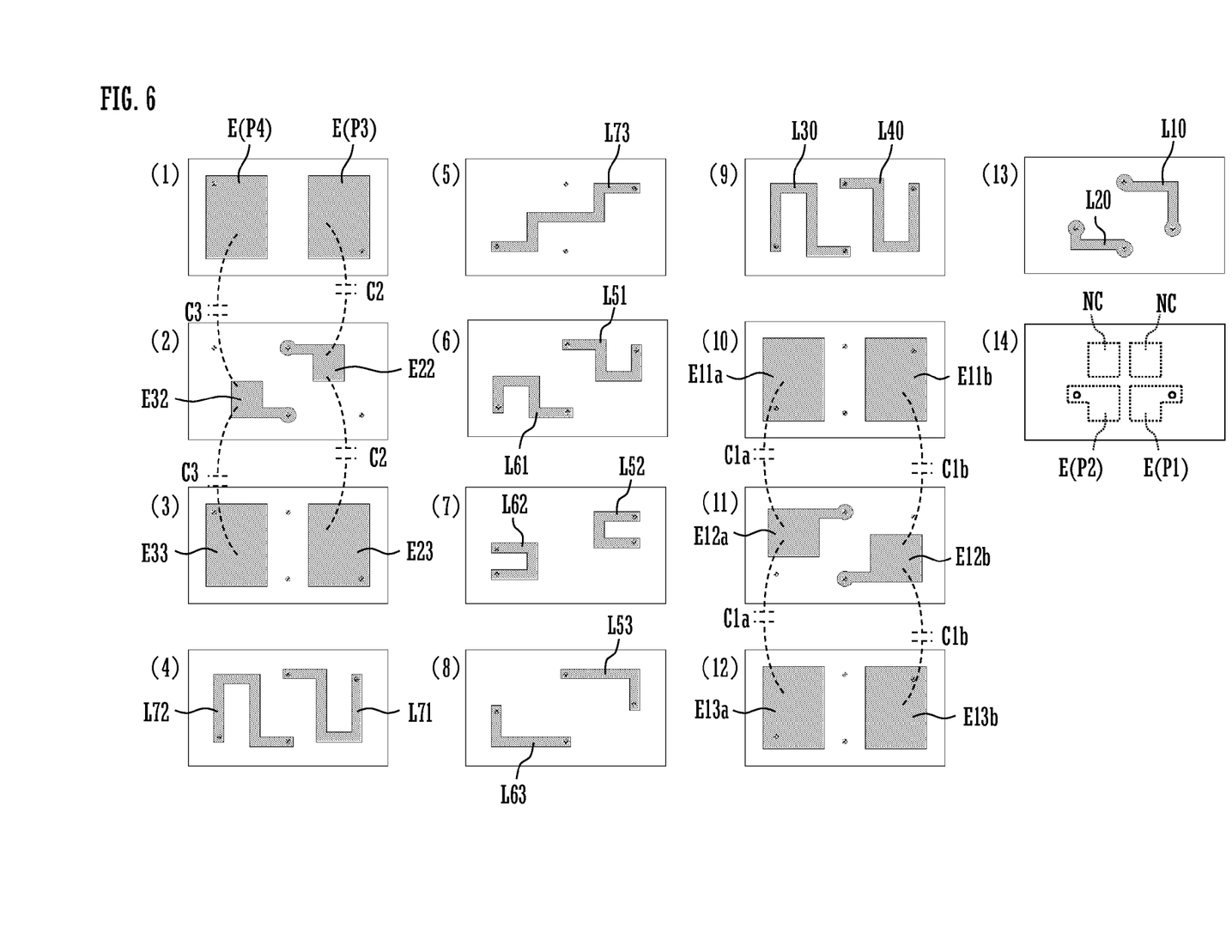
FIG. 6 is a view illustrating a conductor pattern of each layer of a power feeding circuit substrate 12P.

FIG. 6 is a view illustrating a conductor pattern of each layer of the power feeding circuit substrate 12P. (1) indicates a lowermost layer and (14) indicates an uppermost layer. A view of each layer is seen from a mounting surface side (lower surface). Reference numerals in FIG. 6 correspond to reference numerals illustrated in FIG. 3.

Electrodes E (P3) and E (P4) corresponding to the terminals P3 and P4 are provided on the lowermost layer (1). Electrodes E22 and E32 are provided on a layer (2) and electrodes E23 and E33 are provided on a layer (3). The electrodes E22 and E33 conduct the electrodes E (P3) and E (P4) through via conductors. A capacitance C2 is generated between the electrode E22, and one of the electrodes E23 and E (P3). Similarly, a capacitance C3 is generated between the electrode E32, and one of the electrodes E33 and E (P4).

Inductor electrodes L71 and L72 are provided on a layer (4), an inductor electrode L73 is provided on a layer (5), inductor electrodes L51 and L61 are provided on a layer (6), inductor layers L52 and L62 are provided on a layer (7), inductor electrodes L53 and L63 are provided on a layer (8) and inductor electrodes L30 and L40 are provided on a layer (9). The inductor electrodes L71, L72 and L73 among these inductor electrodes define an inductor L7. Further, the inductor electrodes L51, L52 and L53 define an inductor L5. Furthermore, the inductor electrodes L61, L62 and L63 define an inductor L6. Still further, the inductor electrodes L30 and L40 define inductors L3 and L4.

Electrodes E11a and E11b are provided on a layer (10), and electrodes E12a and E12b are provided on a layer (11). Electrodes E13a and E13b are provided on a layer (12). The electrodes E11a and E11b conduct the electrodes E13a and EP13b through via conductors. A capacitance C1a is generated between the electrode E12a, and one of the electrodes E11a and E13a. Similarly, a capacitance C1b is generated between the electrode E12b, and one of the electrodes E11b and E13b.

Inductor electrodes L10 and L20 are provided on the layer (13). The inductor electrodes L10 and L20 define inductors L1 and L2.

The electrodes E (P1) and E (P2) corresponding to the terminals P1 and P2 and non-connection terminal electrodes NC are provided on a top surface of the layer (14) (a surface on a back surface side according to a viewpoint of FIG. 6). The RFID IC chip 11 is mounted on these electrodes.

In addition, each base layer may be made of a ceramic such as LTCC (Low Temperature Co-fired Ceramic) or a resin layer made of thermoplastic resin, for example. That is, the power feeding circuit substrate 12P (see FIG. 5) may be a ceramic multilayer substrate or a resin multilayer substrate. Further, various circuit patterns provided on the multilayer substrate preferably is made of a conductor material such as silver or copper having a low specific electrical resistance, for example.

By providing the broader band conversion circuit and the balance filter circuit on a body (multilayer substrate) including a stack of a plurality of base layers in this way, it is possible to miniaturize the broader band conversion circuit and the balance filter circuit compared to a case where the broader band conversion circuit and the balance filter circuit are formed by individual parts, and miniaturize the RFID power feeding unit 10 illustrated in FIG. 5.

In addition, an example of design where the loop electrode 31 and the broader band conversion circuit 121 and the like provided on the ground conductor 21 are used such that frequency characteristics of a maximum communicable distance in the RFID system show the bimodality and a peak of the frequency characteristics is positioned outside a communication frequency band of the mobile communication system has been described above. However, frequency characteristics of the RFID system and the frequency characteristics of the maximum communicable distance may have unimodality. In this case, it is only necessary to lower steepness of the frequency characteristics of the RFID system, and position a peak (e.g. 800 MHz or 1 GHz) outside a communication frequency band (e.g. 900 MHz band) of the mobile communication system.

Further, an example where the ground conductor of the printed circuit board is preferably used as the RFID system radiator and a portion of the mobile communication antenna has been described above. However, the RFID system radiator and a portion of the mobile communication antenna is not limited to the ground conductor of the printed circuit board and the present invention is also applicable likewise to a case where a conductive housing such as a shield case arranged in a device, a metal case configured to protect a battery or a metal housing on the surface of a device is shared as the RFID system radiator and a portion of the mobile communication antenna.

Further, an example where the communication terminal device includes an RFID tag has been described above. However, the present invention is also applicable likewise to a case where the ground conductor of the printed circuit board or the conductive housing is used as an antenna of an RFID reader/writer.

Further, the mobile communication terminal has been described as an example of the communication device. However, the communication device according to the present invention is also applicable to various wireless communication devices such as notebook computers and tablet computers.

Further, the RFID power feeding unit 10 preferably is configured as a module component by mounting an RFID IC chip on the power feeding circuit substrate 12P. However, the RFID power feeding unit 10 may be configured as a chip-size package by forming the RFID power feeding circuit 12 as a rewiring layer on a surface of the RFID IC chip. Naturally, the RFID power feeding circuit 12 may be configured as a component different from the RFID IC chip.

Further, the loop electrode 31 in the ground conductor 21 is provided with a cutout in the flat ground conductor 21 and a portion of the flat ground conductor 21 is used as a loop electrode portion. However, a loop electrode that is separate from the ground conductor 21 may be coupled to a rim portion of the ground conductor 21 through an electromagnetic field.

Further, a combination of the first communication system and the second communication system may be a combination of the 900 MHz band RFID system and the GSM (registered trademark) 900/GSM (registered trademark) 850 system and, in addition, for example, a combination of the UHF band RFID system and a mobile communication system such as DCS and CDMA. Furthermore, this combination may be a combination of the RFID system and a near field communication system such as Bluetooth (registered trademark) or a wireless LAN, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A communication device comprising:
   a radiator defining a duplex antenna of a first communication system whose carrier frequency is in a first frequency band and a second communication system whose carrier frequency is in a second frequency band overlapping the first frequency band;
   an antenna for the second communication system;
   a second communication system power feeding unit connected to the radiator and the antenna for the second communication system; and
   a first communication system power feeding unit connected to the radiator; wherein
   the first communication system power feeding unit includes a circuit configured to position a communication peak frequency whose communicable distance in the first communication system is maximum, outside the second frequency band.

2. The communication device according to claim 1, wherein
   the first communication system is an RFID system of a UHF band; and
   the second communication system is a mobile communication system of the UHF band.

3. The communication device according to claim 2, wherein
   the antenna for the second communication system is a mobile communication system antenna;
   the second communication system power feeding unit is a mobile communication power feeding unit; and
   the first communication system power feeding unit is an RFID power feeding unit including an RFID IC and an RFID power feeding circuit connected to the RFID IC.

4. The communication device according to claim 3, wherein the RFID power feeding circuit includes a broader band conversion circuit connected between the RFID IC and the radiator and configured to convert frequency characteristics of the RFID system into a broadband.

5. The communication device according to claim 3, wherein the radiator is a ground conductor, and the RFID power feeding unit and the ground conductor define an RFID tag.

6. The communication device according to claim 3, wherein the radiator is a ground conductor, the RFID power feeding circuit includes a balance filter circuit, and the broader band conversion circuit and the balance filter circuit define matching circuits configured to match an impedance between the RFID IC and the ground conductor.

7. The communication device according to claim 3, wherein the RFID power feeding unit is a module or chip-size package.

8. The communication device according to claim 4, wherein the broader band conversion circuit is configured to produce two resonance points on a lower band side and on a higher band side than the second frequency band.

9. The communication device according to claim 4, wherein the broader band conversion circuit is provided in a body including a stack of a plurality of base layers.

10. The communication device according to claim 1, wherein the radiator is a conductive housing or a ground conductor.

11. The communication device according to claim 1, wherein the radiator is a ground conductor, the antenna for the second communication system is a mobile communication antenna, and the ground conductor and the mobile communication antenna define a dipole antenna for mobile communication.

12. The communication device according to claim 1, wherein the radiator is a ground conductor provided in or on a printed circuit board.

13. The communication device according to claim 1, wherein the ground conductor includes a cutout including a loop electrode therein.

14. The communication device according to claim 1, wherein the communication device is a mobile communication terminal.

15. The communication device according to claim 1, wherein the communication device is a wireless communication device.

16. The communication device according to claim 1, wherein the communication device is computer.

* * * * *